Nov. 12, 1935.                H. S. ESTLER                  2,020,678
                        APPARATUS FOR LUBRICATION
                          Filed Dec. 18, 1930
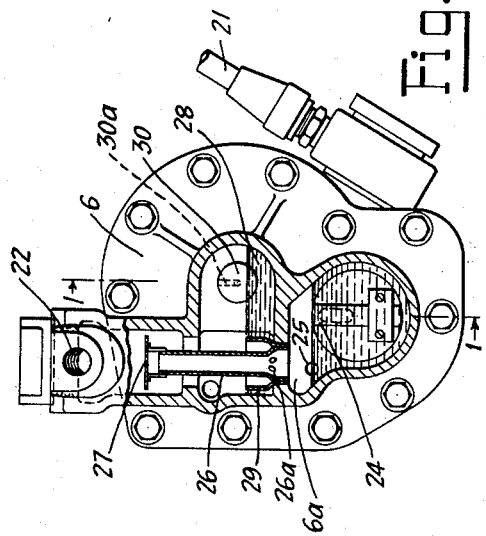
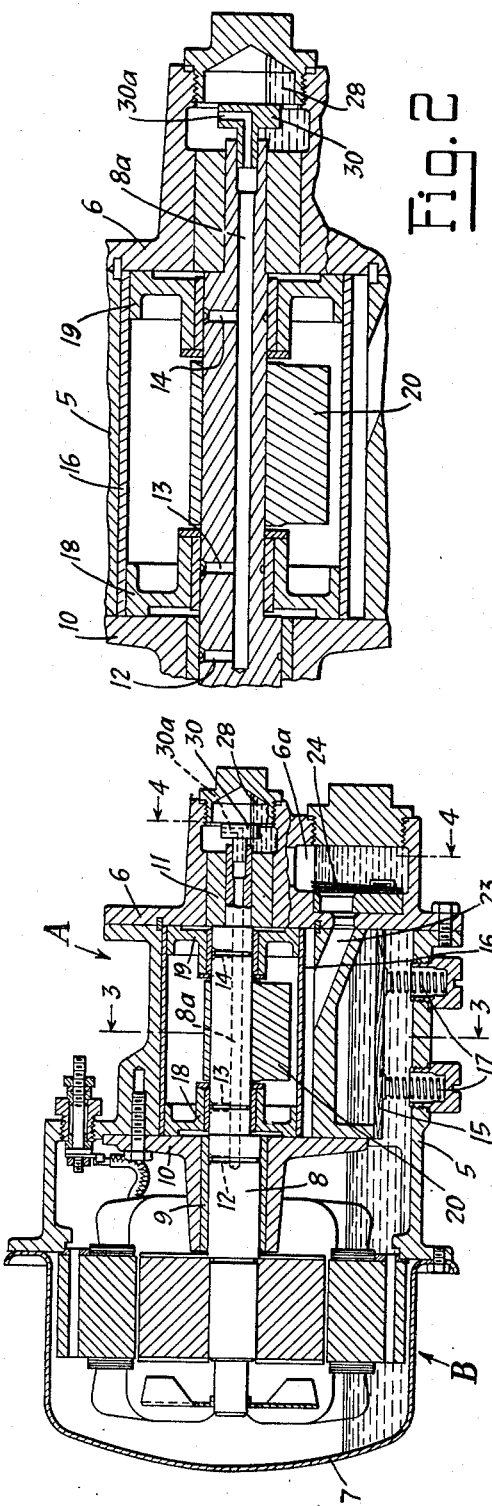
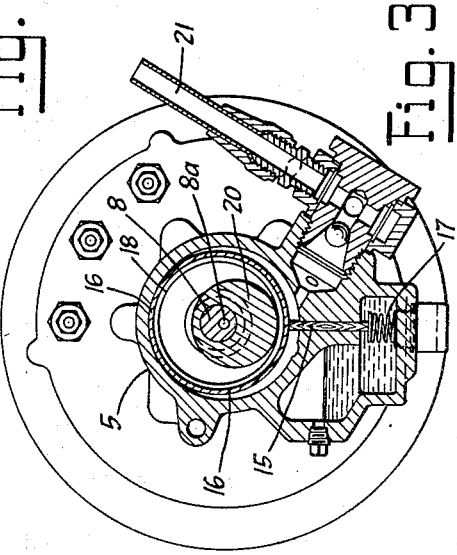
INVENTOR.
Harry S. Estler
BY
Ira L. Nickerson
ATTORNEY.

Patented Nov. 12, 1935

2,020,678

UNITED STATES PATENT OFFICE 2,020,678

APPARATUS FOR LUBRICATION

Harry S. Estler, Detroit, Mich., assignor to Chicago Pneumatic Tool Company, New York, N. Y., a corporation of New Jersey Application December 18, 1930, Serial No. 503,130

15 Claims. (Cl. 184—6)

This invention relates to lubrication of operating mechanism. While having features of general application it has been developed with special reference to problems encountered in rotary pumps, especially in sealed motor-pump units used in refrigerating systems.

When feeding liquid such as lubricant from a chamber under pressure to or toward another chamber such as may be formed within the rotary member of a rotary pump, there is a tendency for the last named chamber to fill with lubricant due to the fact that slippage or movement of gas out of the rotor chamber by centrifugal action produces reduced pressure or a partial vacuum in that chamber. The rotor thus becomes unbalanced by reason of the body of lubricant therein, resulting in vibration and interference with the free rotation of the rotor.

Among the objects of the invention are to provide improved methods and apparatus for feeding oil or other liquid into a substantially closed space, to limit the movement of a liquid such as lubricant into a chamber within a rotating member, to secure efficient lubrication of the bearings of a rotary pump without unbalancing the rotor by a body of lubricant therewithin, to effect a substantial balancing of pressures along with the movement of a limited amount of liquid, and in general to improve prior processes and apparatus in the interest of more efficient and satisfactory service and operation.

Instead of feeding lubricant only from a reservoir or chamber under pressure to the rotor bearings as through a hollow shaft submerged in the lubricant, the present invention involves breaking or interrupting the lubricant movement either intermittently or regularly by the movement of gas or vapor. Suitable means may be conveniently provided on the shaft for this purpose. A member communicating with a bore in the shaft may be arranged alternately to dip into the lubricant and out again into the vapor space above the lubricant. By preference the member takes the form of a disc bored to provide an orifice near its periphery communicating with the bore in the shaft. Thus a supply of air or vapor and lubricant is fed to the rotor chamber rather than lubricant alone with the result that the pressure in the rotor chamber can never fall far below that of the lubricant reservoir nor can the rotor chamber fill with lubricant. The air or gas thus admitted from the lubricant reservoir replaces the gas lost from the rotor chamber by slippage.

In order to illustrate the invention and the manner of its use and operation, one concrete embodiment thereof is shown in the accompanying drawing, in which:

Fig. 1 is a longitudinal vertical sectional view through a totally enclosed and sealed motor pump unit substantially on the broken line 1—1 of Fig. 4;

Fig. 2 is a detail sectional view on an enlarged scale through the pump rotor;

Fig. 3 is a transverse sectional view substantially on the line 3—3 of Fig. 1; and Fig. 4 is a transverse sectional view substantially on the broken line 4—4 of Fig. 1.

In the embodiment of the invention chosen for the purpose of illustration, a rotary pump A of the stationary abutment type is shown combined with an electrical motor B to form a totally enclosed and sealed motor pump unit which comprises pump casing 5, closure member 6, and motor casing 7. The illustrative pump is a type suitable for use in a refrigerating system operating upon the conventional evaporator-pump-condenser cycle. The motor and the pump have a single common shaft 8 supported in suitable bearings, such as bearing 9 in spacing member 10 secured to pump casing 5 and bearing 11 in closure member 6. The shaft has a bore 8a extending from the closure end with suitable cross bores and annular grooves at 12, 13, and 14 through which lubricant may be conducted to the bearings and other moving parts of the shaft and of the pump. The lower portions of both pump casing 5 and motor casing 7 provide a reservoir or sump for lubricant which is maintained at a sufficient level to cover at least the lower portions of the abutment plate or blade 15 (Figs. 1 and 3) which is maintained in contact with piston 16 of the pump by springs 17. Piston 16 is in the form of a tube of uniform diameter eccentrically supported in the piston chamber of pump casing 5 by ring members or annuli 18 and 19 which have a bearing on shaft 8 over the cross bores and grooves 13 and 14 respectively. With this arrangement ring members 18 and 19 may rotate on shaft 8 and piston 16 may rotate relative to these ring members during its progressive eccentric movement within the piston chamber of casing 5. Thus the pressure of abutment member 15 on piston 16 will cause the latter to slip relative to the shaft and greatly reduce the wear on the engaging face of the abutment member. Ring members 18 and 19 may be maintained in spaced relation by suitable means such as counterweight 20. The pump is shown as having a single fluid inlet connection 21 (Figs. 1, 3, and 4) and a single outlet connection 22 (Fig. 4).

In operation the pump discharges under pressure through a short passage 23 and past check valve 24 a stream of gas, vapor, and liquid into a chamber 6a formed in the lower part of closure member 6. This chamber contains liquid, which is substantially all lubricant although in a refrigerating system some refrigerant liquid may be present, to a sufficient height to dampen the action and noise of check valve 24, the height of the liquid being determined by a port 25 which carries any excess into the sump in the lower portions of pump casing 5 and motor casing 7. The passing of the stream of gas and vapor through the liquid in chamber 6a results in a considerable entrainment of liquid in the discharge products. As the discharged vapor, gas, and entrained liquid move from chamber 6a to discharge connection 22 they are caused to pass through a baffle or separator member 26 which provides a tubular conduit of substantial length topped by a baffle plate 27 against which the gaseous products directly impinge and are diverted laterally. Any entrained liquid thus precipitated against the walls of closure member 6 runs downwardly and becomes a part of a reservoir 28 of lubricant adjacent the right end of shaft 8 (Fig. 1), the height of the liquid level in the reservoir being determined by a flaring annular flange member 29 secured to or forming a part of separator 26. The overflow of reservoir 28 as well as any liquid deposited upon the exterior of separator tube 26 passes by gravity into chamber 6a through ports 26a.

The bore 8a in shaft 8 together with cross bores 13 and 14 serves as a connection between the chamber containing lubricant reservoir 28 (which is under discharge pressure) and the hollow space or chamber within piston 16. Inasmuch as the rotation of piston 16 tends to expel the air and gas from the hollow space therewithin even when slippage occurs between piston 16 and shaft 8, there is a tendency for this hollow space to fill with lubricant from reservoir 28 if bore 8a opens into the pressure chamber beneath the liquid level of reservoir 28. To prevent the unbalancing of the rotor which would result from such an arrangement, suitable means are provided for admitting gas and vapor from the pressure chamber about separator 26. To this end a member 30 having a radial bore 30a connecting with shaft bore 8a is secured to the end of shaft 8. By preference member 30 takes the form of a disk in order to create as little disturbance in oil reservoir 28 as possible and bore 30a extends to the periphery thereof. As shaft 8 rotates bore 30a dips alternately into the oil reservoir 28 and into the gas and vapor space thereabove so that alternate bodies of lubricant and gas are fed through bore 8a. On account of the necessary clearance between the shaft 8 and the rotor bearings, the gas admitted to the duct 8a will be permitted to flow to the chamber within the piston, thereby preventing too great a pressure difference between this chamber and the reservoir chamber 28. Hence instead of feeding lubricant in a solid stream, as would be the case if bore 8a opened beneath the surface of reservoir 28, the lubricant is fed in limited amount just sufficient to replace the oil that has leaked from the rotor chamber and its accumulation as an unbalancing body within piston 16 is prevented.

Davenport Patent 1,925,556, issued September 5, 1933, discloses a pump of a similar type having means for separating the lubricant from the discharge gas.

While the invention has been herein disclosed in both its process and apparatus aspects in what is now considered to be a preferred form, it is to be understood that the invention is not restricted to the specific details thereof but covers all changes, modifications, and adaptations within the scope of the appended claims.

I claim as my invention:

1. In combination, a rotatable shaft having bearings, a hollow rotor free to revolve thereon, and a device for feeding oil to said bearings and gas to said rotor.

2. In combination, a rotatable shaft having bearings, a hollow rotor free to revolve thereon, and a device operated by the rotation of said shaft for feeding oil to said bearings and gas to said rotor.

3. In combination, a rotatable shaft having bearings, a hollow rotor free to revolve thereon, and means including a single duct for feeding oil to said bearings and gas to the hollow interior of said rotor.

4. In combination, a rotatable shaft having bearings, a hollow rotor free to revolve thereon, and means including a bore in said shaft for feeding oil to said bearings and gas to the hollow interior of said rotor.

5. In a pumping unit having a rotatable shaft with bearings, a hollow rotor revolvable thereon, said unit providing a reservoir for oil and gas, and means including a bore in said shaft for feeding alternate bodies of oil and gas from said reservoir to said rotor and bearings.

6. In a pumping unit having a rotatable shaft with bearings, a hollow rotor revolvable thereon, said unit providing a reservoir for oil and gas, said shaft having a bore extending to said bearings, and means on said shaft disposed in said reservoir for feeding oil and gas in alternation into said bore.

7. In a pumping unit having a rotatable shaft with bearings, a hollow rotor revolvable thereon, said unit providing a reservoir for oil and gas, and means including a member disposed in said reservoir and actuated by said shaft for feeding oil to said bearings and gas to said rotor.

8. In a pumping unit having a rotatable shaft with bearings, a hollow rotor revolvable thereon, said unit providing a reservoir for oil and gas, said shaft having an axial bore communicating with said bearings, and means on said shaft having a radial bore connecting with said axial bore arranged to take oil and gas alternately from said reservoir.

9. In a pumping unit having a rotatable shaft with bearings, a hollow rotor revolvable thereon, said unit providing a reservoir for oil and gas, said unit providing a reservoir for oil and gas, a single duct extending to said bearings, and means rotatably mounted in said reservoir for supplying oil and gas in alternation to said duct.

10. In a pumping unit having a rotatable shaft with bearings, a hollow rotor revolvable thereon, said unit providing a reservoir for oil and gas, said shaft having a bore extending to said bearings, and means including a rotary member disposed in said reservoir and actuated by said shaft for supplying oil and gas in alternation to said duct.

11. In a pumping unit having a rotatable shaft with bearings, a hollow rotor revolvable thereon, said unit providing a reservoir for oil and gas, said shaft having a bore extending to said bearings, and a disk on said shaft partly immersed in the oil in said reservoir and having a radial bore extending to the periphery thereof and communicating with said shaft bore for feeding oil and gas in alternation to the latter.

12. A rotary pump having a piston chamber, a rotatable shaft extending therethrough, ring members rotatably mounted upon said shaft, means maintaining said members in spaced relation, a tubular piston rotatable upon said rings for progressive eccentric movement within said piston chamber, a blade in contact with said piston, means including a passageway for supplying lubricant to said shaft members from a source having a higher pressure, and means including said passageway adapted periodically to render ineffective the pressure difference between the source and said members whereby to prevent accumulation of lubricant within said piston.

13. A rotary pump having a piston chamber, a rotatable shaft extending therethrough, ring members rotatably mounted upon said shaft, a counterweight secured to said shaft between said members and maintaining the same in spaced relation, a tubular piston rotatable upon said rings for progressive eccentric movement within said piston chamber, a blade in contact with said piston, a lubricant chamber subjected to gas pressure, means supplying lubricant from said lubricant chamber through said shaft to the bearings for said ring members, and means for periodically conducting gas from said lubricant chamber to the interior of the piston whereby to prevent accumulation of lubricant within said piston.

14. In operating mechanism having a chamber under pressure containing a reservoir of oil, a rotor having bearings and a substantially closed chamber adjacent said bearings, means connecting the chambers thereby tending to equalize the pressures in said chambers and feeding oil from said pressure chamber to said bearings, said connecting means being arranged to limit the quantity of oil fed thereby.

15. In operating mechanism having a chamber under pressure containing a reservoir of oil, a rotor having bearings and a substantially closed chamber adjacent said bearings, means for supplying oil from said reservoir to said bearings, said means being adapted periodically to conduct gas from said pressure chamber to the rotor chamber whereby to prevent accumulation of lubricant in the rotor chamber.

HARRY S. ESTLER.